(12) United States Patent
Liu et al.

(10) Patent No.: US 12,006,668 B2
(45) Date of Patent: Jun. 11, 2024

(54) CONNECTING DEVICE FOR SHOWER APPARATUS

(71) Applicant: Xiamen Rainshower Co. Ltd., Xiamen (CN)

(72) Inventors: Hewei Liu, Xiamen (CN); Weifeng Zeng, Xiamen (CN); Ruiqiang Zhang, Xiamen (CN)

(73) Assignee: XIAMEN RAINSHOWER CO., LTD., Xiamen (CN)

(*) Notice: Subject to any disclaimer, the term of this patent is extended or adjusted under 35 U.S.C. 154(b) by 11 days.

(21) Appl. No.: 18/102,774

(22) Filed: Jan. 30, 2023

(65) Prior Publication Data

US 2023/0295905 A1   Sep. 21, 2023

(30) Foreign Application Priority Data

Mar. 17, 2022  (CN) .......................... 202220587760.7

(51) Int. Cl.
*E03C 1/02* (2006.01)
*E03C 1/04* (2006.01)
*F16K 11/085* (2006.01)

(52) U.S. Cl.
CPC ............ *E03C 1/023* (2013.01); *E03C 1/0409* (2013.01); *F16K 11/085* (2013.01)

(58) Field of Classification Search
CPC ...... E03C 1/023; E03C 1/0408; E03C 1/0409; F16K 11/085–0856
See application file for complete search history.

(56) References Cited

U.S. PATENT DOCUMENTS

| 5,901,387 | A | * | 5/1999 | Fan | ........................... E03C 1/02 4/675 |
| 7,197,776 | B2 | | 4/2007 | Tsai | |
| 7,299,510 | B2 | | 11/2007 | Tsai | |
| 10,232,386 | B1 | * | 3/2019 | Lu | ....................... F16K 11/0743 |
| 10,968,612 | B1 | | 4/2021 | Tzeng | |
| 11,273,456 | B2 | * | 3/2022 | Zhang | ................... F16K 27/065 |

* cited by examiner

*Primary Examiner* — Kevin F Murphy

(57) ABSTRACT

A connecting device for a shower apparatus includes a shower column and a waterway switching device. The shower column is composed of a bending segment and a straight rod segment. A projection length of the shower column along the vertical projection plane Y is L1, L1 is between 210 mm and 310 mm, and a projection length of the shower column along the horizontal projection plane X is L2, L2 is between 290 mm and 350 mm, the length of the shower column of the present application is significantly shortened, and the logistics cost for transporting the same number of products is greatly reduced.

10 Claims, 11 Drawing Sheets

CONNECTING DEVICE FOR SHOWER APPARATUS

CROSS-REFERENCE TO RELATED APPLICATIONS

The present application claims the priority to Chinese Patent Application No. 2022205877607, filed on Mar. 17, 2022, which is incorporated by reference herein in its entirety.

FIELD

The present application relates to the sanitary ware field, in particular to a connecting device for a shower apparatus.

BACKGROUND

Details for a holder device for a shower nozzle typically found today, may be found in U.S. Pat. No. 7,197,776. As shown in FIG. 1 of the '776 patent, the assembly of the holder device and the shower nozzle includes a shower nozzle 11a, a water outlet pipe 10a and a control device 13a. The shower nozzle 11a can be directly installed on the water outlet pipe 10a, or connected to the water outlet pipe 10a by a hose 12a, specifically, the water outlet pipe 10a is connected to a previously embedded mixing pipe to supply water to the shower nozzle 11a. The control device 13a is arranged below the water outlet pipe 10a to control how the hot water and/or cold water passes through the water outlet pipe 10a.

A holder device for a dual shower is disclosed in U.S. Pat. No. 7,299,510. As shown in FIG. 2, the assembly of the holder device and the dual shower includes a shower head 20b, a hand-held shower 22b, a water outlet pipe 90b, a holder device 1b and a control device 92b. The holder device 1b includes a housing 10b, a reversing valve core and a socket 24b. The reversing valve core is installed in the housing 10b, and the socket 24b is fixed on one side of the housing 10b. The housing 10b includes one water inlet 11b and two water outlets 16b, 17b. The water inlet 11b is installed on the water outlet pipe 90b through a fastener 12b. The two water outlets 16b, 17b are respectively connected to the shower head 20b and the hand-held shower 22b with a hose 23b. The hand-held shower 22b is attached to the socket 24b, specifically, the water outlet pipe 90b is attached to or extended to a wall or a support surface 91b, and is connected to a previously embedded mixing pipe. The control device 92b is arranged below the water outlet pipe 90b to control how the hot water and/or cold water passes through the water outlet pipe 90b. With the above design, the water flow flowing into the housing 10b from the water inlet 11b is controlled by the reversing valve core to pass through one or two of the two water outlets 16b and 17b, so that the shower head 20b and the hand-held shower 22b can selectively or simultaneously discharge water.

Another dual shower is disclosed in U.S. Pat. No. 10,968,612 for details, as shown in FIG. 3, the dual shower includes a water inlet pipe 10c, a first water distributor 20c, a first shower rod 30c, a second shower rod 40c and a second water distributor 50c. The water flow enters from a water inlet channel 101c of the water inlet pipe 10c into the first water distributor 20c. The first water distributor 20c includes a first water inlet end 22c, an upper water outlet end 24c and a first lower water outlet end 25c. The upper water outlet end 24c is connected to the first shower rod 30c, the first lower water outlet end 25c is connected to the second shower rod 40c, the first shower rod 30c is provided with a first channel 32c, a top end of the first shower rod 30c is connected to a shower nozzle 31c, the first channel 32c is connected to the shower nozzle 31c, and the second shower rod 40c is provided with a second channel 41c. The second water distributor 50c is connected to one end of the second shower rod 40c and is opposite to the first water distributor 20c. The second water distributor 50c includes a valve part 51c, a second water inlet end 52c and a second lower water outlet end Mc. The second lower water outlet end Mc is connected to a handheld shower head 61c through a flexible water outlet pipe 60c. The valve part 51c includes an opened state and a closed state. In the opened state, the water flow flows from the water inlet channel 101c to the second channel 41c through the water inlet end 22c and the first lower water outlet end 25c in turn, and then flows through the second water inlet end 52c and the second lower water outlet end 54c in turn to realize water outlet of the handheld shower head 61c. In the closed state, the water flow flows from the water inlet channel 101c to the first channel 32c through the water inlet end 22c and the upper water outlet end 24c in turn to realize the water outlet of the shower nozzle 31c. The structure of the dual shower is complex, and the total length of the shower column is too large. When transporting product, the level of logistics transportation cost is often positively related to the size of the container space occupied by its packaging. That is, the larger the length of the shower column is, the larger the overall volume of the packaging will be, which will lead to further increase in logistics cost.

In view of this, the present application has made an in-depth study on the above-described deficiencies in the prior art, and thus, the present application is developed.

SUMMARY

Aspects of the present application are to provide a connecting device applicable to a shower apparatus with simple structure and low transportation cost.

To achieve the above aspects, the present application discloses a connecting device for a shower apparatus, the connecting device includes: a shower column and a waterway switching device.

The shower column is composed of a bending segment and a straight rod segment. Specifically, a projection length of the shower column along a vertical projection plane Y is L1, L1 is between 210 mm and 310 mm, and a projection length of the shower column along a horizontal projection plane X is L2, L2 is between 290 mm and 350 mm, the bending segment is substantially L-shaped, and a lower part of a free end of the bending segment is provided with a first water outlet, the first water outlet is configured to connect a top spray, and the shower column is provided with a through water outlet channel therein.

The waterway switching device includes a valve seat, a water distributing valve core and a knob. Specifically, the valve seat has a hollow inner cavity. a number of partitions are provided in the inner cavity, so that a water inlet chamber and a valve core chamber, which are mutually independent in space but are in fluid communication, are respectively formed at two axial ends, and a first water holding chamber and a second water holding chamber, which are mutually independent in space and have separated waterways, are formed at two radial ends. An outer end of the water inlet chamber is provided with a water inlet. An outer end of the first water holding chamber is provided with a first connection port, and the first connection port is vertically upward, and is connected to the straight rod segment of the shower column, an outer end of the second water holding chamber is provided with a second water outlet, and the second water outlet is configured to connect an additional water apparatus. A vertical partition is formed between the valve core chamber and the first water holding chamber and the second water holding chamber, respectively, the vertical partition is correspondingly provided with at least one first water-passing opening and one second water-passing opening at positions corresponding to the first water holding chamber and the second water holding chamber, so that the valve core chamber is in fluid communication with the first water holding chamber only through the first water-passing opening, and the valve core chamber is in fluid communication with the second water holding chamber only through the second water-passing opening. The water distributing valve core is configured to have at least one radial water inlet end and one axial water outlet end, the water distributing valve core is disposed in the valve core chamber, and an outer end of the valve core chamber is arranged with a knob, and the axial water outlet end of the water distributing valve core is driven to be in fluid communication with the first water-passing opening and/or the second water-passing opening by turning the knob.

With the above design, when the axial water outlet end of the water distributing valve core is driven, by turning the knob, to be in communication with the first water-passing opening, the external water source flows through the water inlet into the water inlet chamber and the valve core chamber successively, and then flows into the water distributing valve core successively through the radial water inlet end of the water distributing valve core, and then flows through the axial water outlet end of the water distributing valve core and the first water-passing opening into the first water holding chamber successively, and flows through the first connection port into the water outlet channel of the shower column, at this time, the top spray sprays water. When the axial water outlet end of the water distributing valve core is in communication with both the first water-passing opening and the second water-passing opening, the water flow flows through the axial water outlet end towards the first water-passing opening and the second water-passing opening at the same time, and correspondingly flows into the first water holding chamber and the second water holding chamber, and then flows through the first connection port and the second water outlet and then correspondingly flows into the water outlet channel of the shower column and the inner cavity of the additional water apparatus respectively, and in this case, both the top spray and the additional water apparatus discharge water at the same time. When the axial water outlet end of the water distributing valve core is in communication with the second water-passing opening, the water flow flows through the axial water outlet end and the second water-passing opening into the second water holding chamber successively, and flows through the second water outlet into the inner cavity of the additional water apparatus, and at this time, the additional water apparatus discharges water. Compared with the conventional technology, the present application has a simple structure and is convenient for use; moreover, even if the maximum limit values of shower columns L1 and L2 are taken, that is, the total length L1 of the shower column is 310 mm, and the total width L2 is 350 mm, compared with the shower columns on the market, the length of the shower column of the present application is significantly shortened, and the logistics cost for transporting the same number of products is greatly reduced, thus improving the competitiveness of the products.

DETAILED DESCRIPTION OF EMBODIMENTS

The present application is described in detail hereinafter in combination with the drawings and embodiments.

Figure 1:
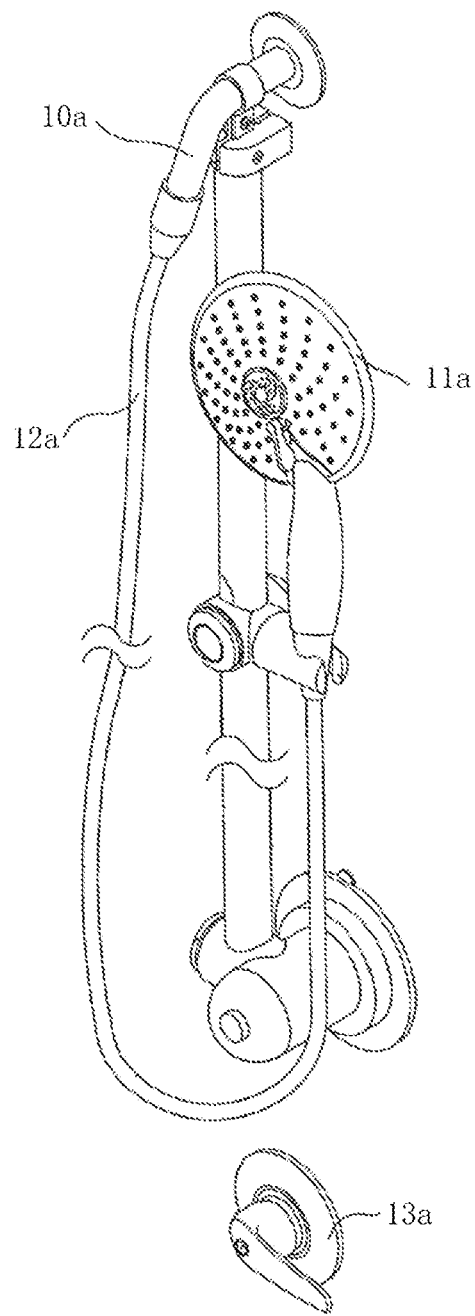
FIG. 1 is a figure disclosed in Patent document U.S. Pat. No. 7,197,776.
Figure 2:
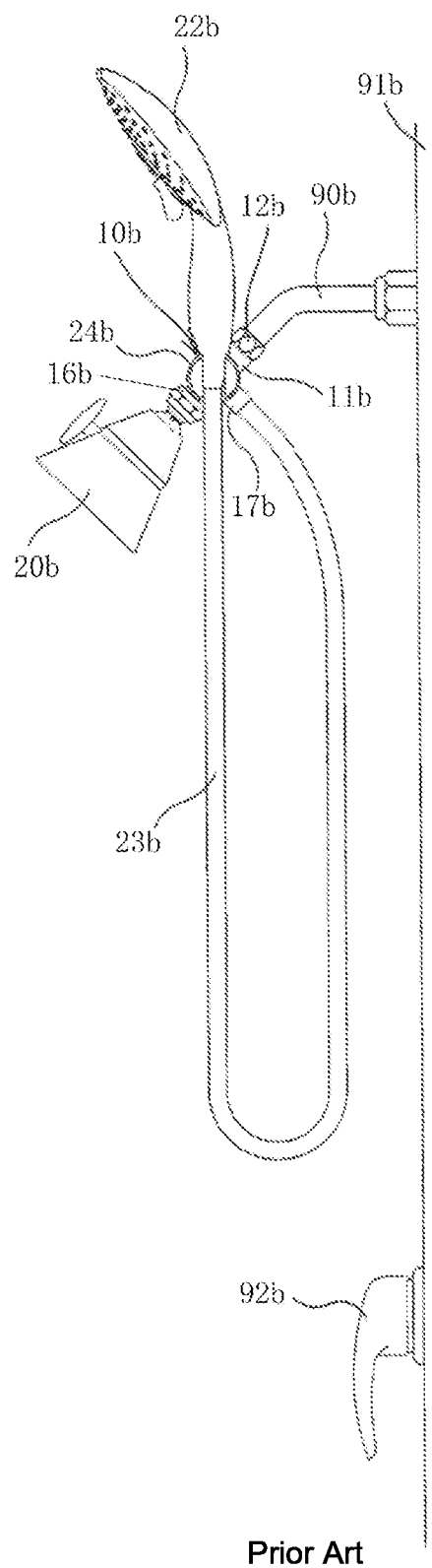
FIG. 2 is a figure disclosed in Patent document U.S. Pat. No. 7,299,510.
Figure 3:
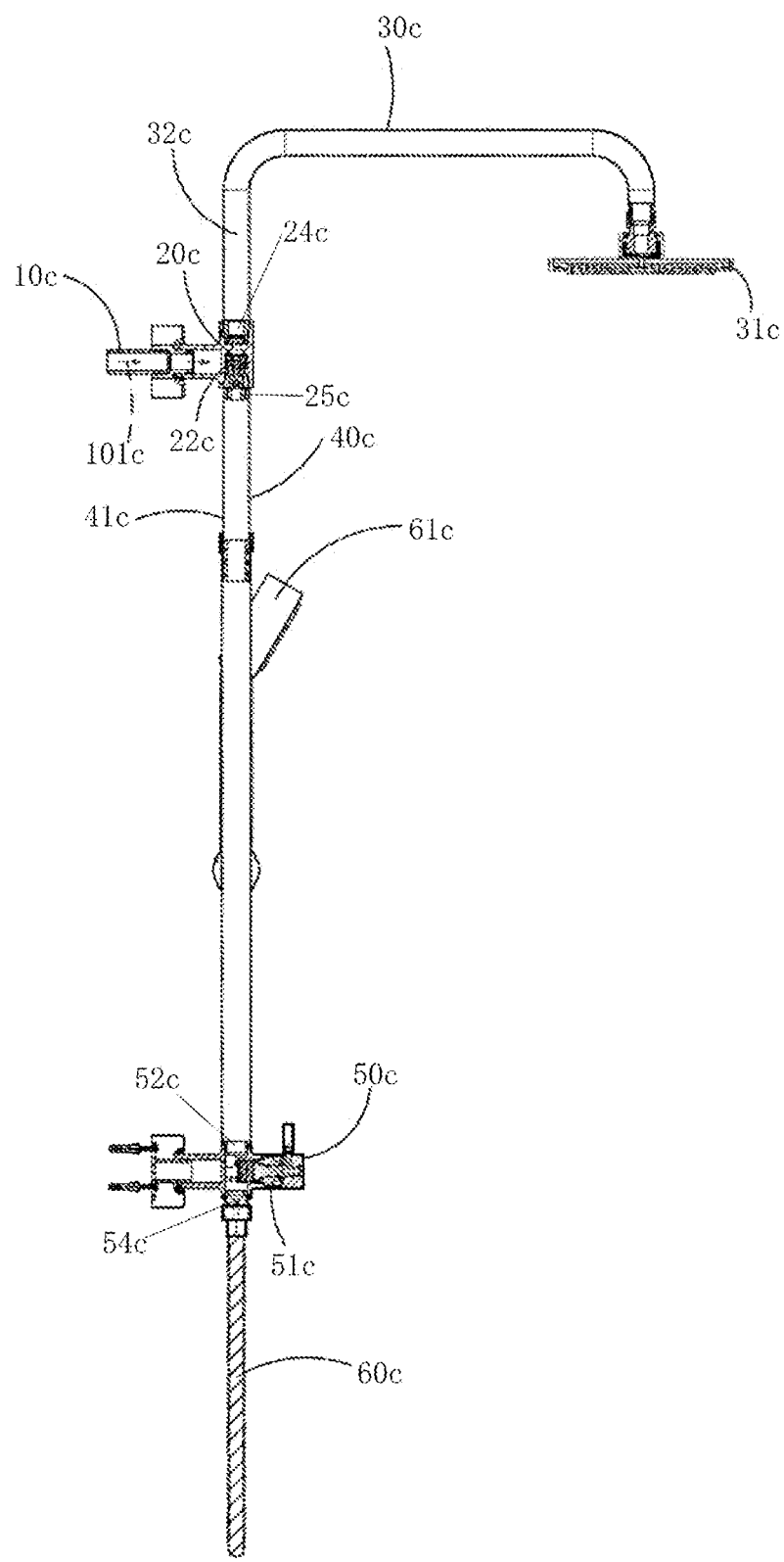
FIG. 3 is a figure disclosed in Patent document U.S. Pat. No. 10,968,612.
Figure 4:
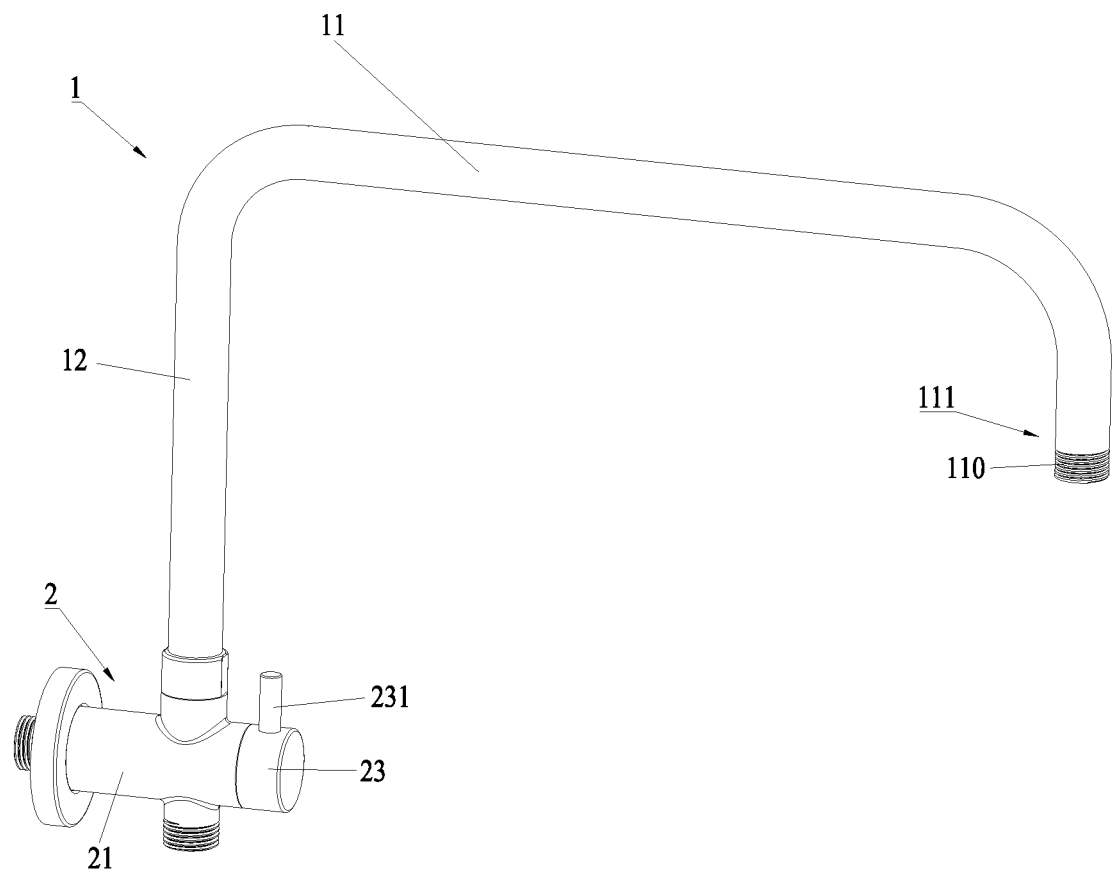
FIG. 4 is a perspective view of a waterway connecting device in an assembled state according to the present application.
Figure 5:
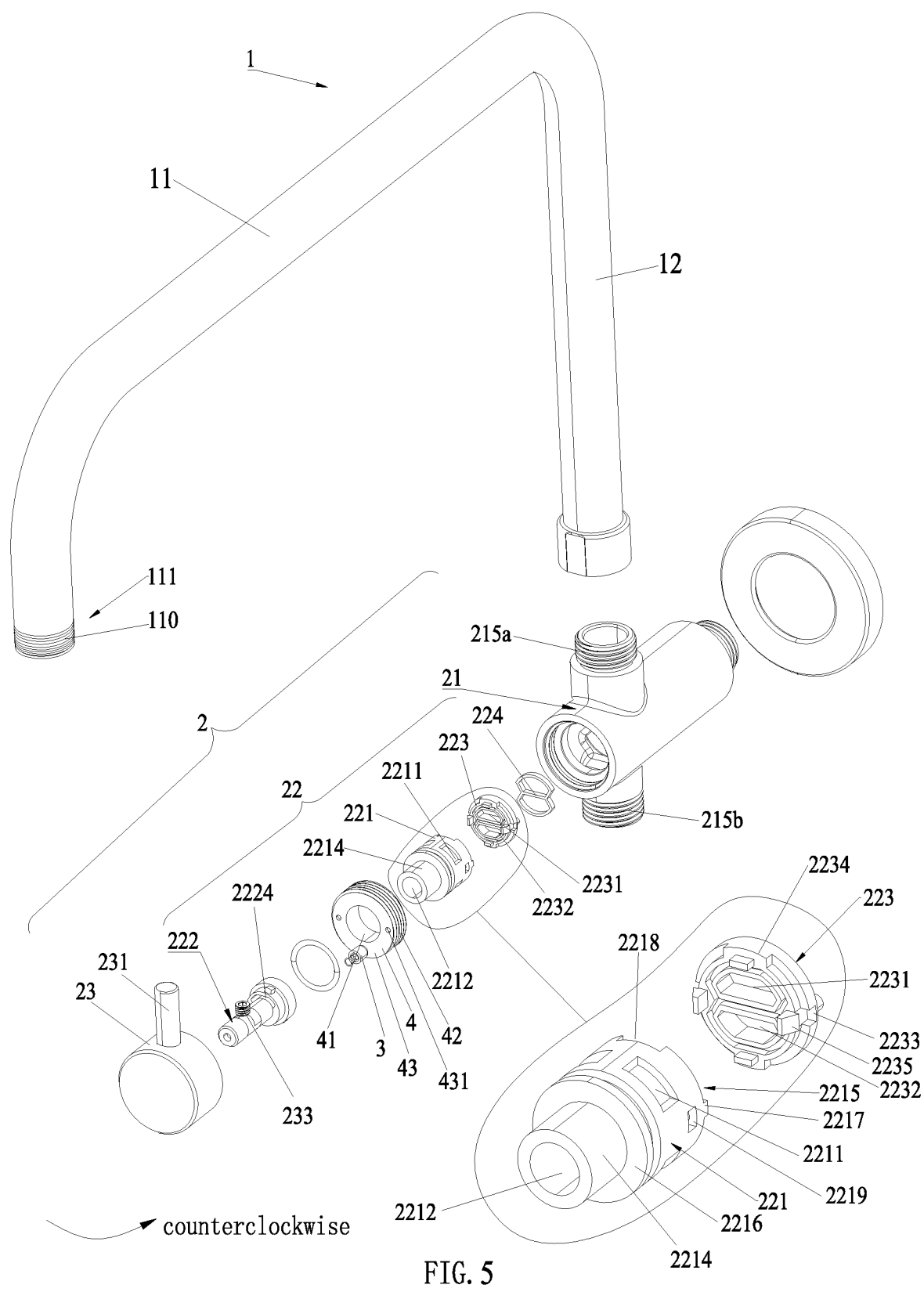
FIG. 5 is an exploded view of the waterway connecting device according to the present application.

Referring to FIGS. 4 and 5, the present application discloses a connecting device for a shower apparatus, which includes: a shower column 1 and a waterway switching device 2.

The shower column 1 is L-shaped and is composed of a bending segment 11 and a straight rod segment 12. A projection length of the shower column along a vertical projection plane Y is L1, L1 is between 210 mm and 310 mm, and a projection length of the shower column along a horizontal projection plane X is L2, L2 is between 290 mm and 350 mm Compared with the shower column on the market, even if the maximum limit values of L1 and L2 are taken, the total length and total width of the shower column 1 according to the present application are significantly shortened, and when the shower column is transported, its cost of logistics transportation is greatly reduced, thus reducing the cost of enterprises. The bending segment 11 is substantially L-shaped, and the connection between one end of the bending segment 11 and the straight rod segment 12 is preferably implemented by means of arc transition. Apparently, in part of embodiments, it is also one of the embodiments that a right angle is used for transition. The other end is a free end 111. A lower part of the free end 111 is provided with a first water outlet 110, and the first water outlet 110 is configured to connect a top spray 10. The shower column 1 is provided with a through water outlet channel 13 therein.

Reference is made to FIG. 5, the waterway switching device 2 includes a valve seat 21, a water distributing valve core 22 and a knob 23. The valve seat 21 has a hollow inner cavity. A number of partitions are provided in the inner cavity, so that a water inlet chamber 211 and a valve core chamber 213, which are mutually independent in space but are in fluid communication, are respectively formed at two axial ends, and a first water holding chamber 214a and a second water holding chamber 214b, which are mutually independent in space and have separated waterways, are formed at two radial ends. The outer end of water inlet chamber 211 is provided with a water inlet 2110. A water inlet channel 212 is arranged between the water inlet chamber 211 and the valve core chamber 213. The water inlet channel 212 is in communication with the water inlet chamber 211 and the valve core chamber 213, so as to realize fluid communication between the water inlet chamber 211 and the valve core chamber 213. A vertical partition 216 is formed between the valve core chamber 213 and the first water holding chamber 214a and the second water holding chamber 214b, respectively. The vertical partition 216 is correspondingly provided with a first water-passing opening 2161a and a second water-passing opening 2161b at positions corresponding to the first water holding chamber 214a and the second water holding chamber 214b, so that the valve core chamber 213 is in fluid communication with the first water holding chamber 214a only through the first water-passing opening 2161a, and the valve core chamber 213 is in fluid communication with the second water holding chamber 214b only through the second water-passing opening 2161b. An outer end of the first water holding chamber 214a is provided with a first connection port 215a, the first connection port 215a is vertically upward, for connecting the straight rod segment 12 of the shower column 1, an outer end of the second water holding chamber 214b is provided with a second water outlet 215b, and the second water outlet 215b is vertically downward, for connecting an additional water apparatus.

Figure 9:
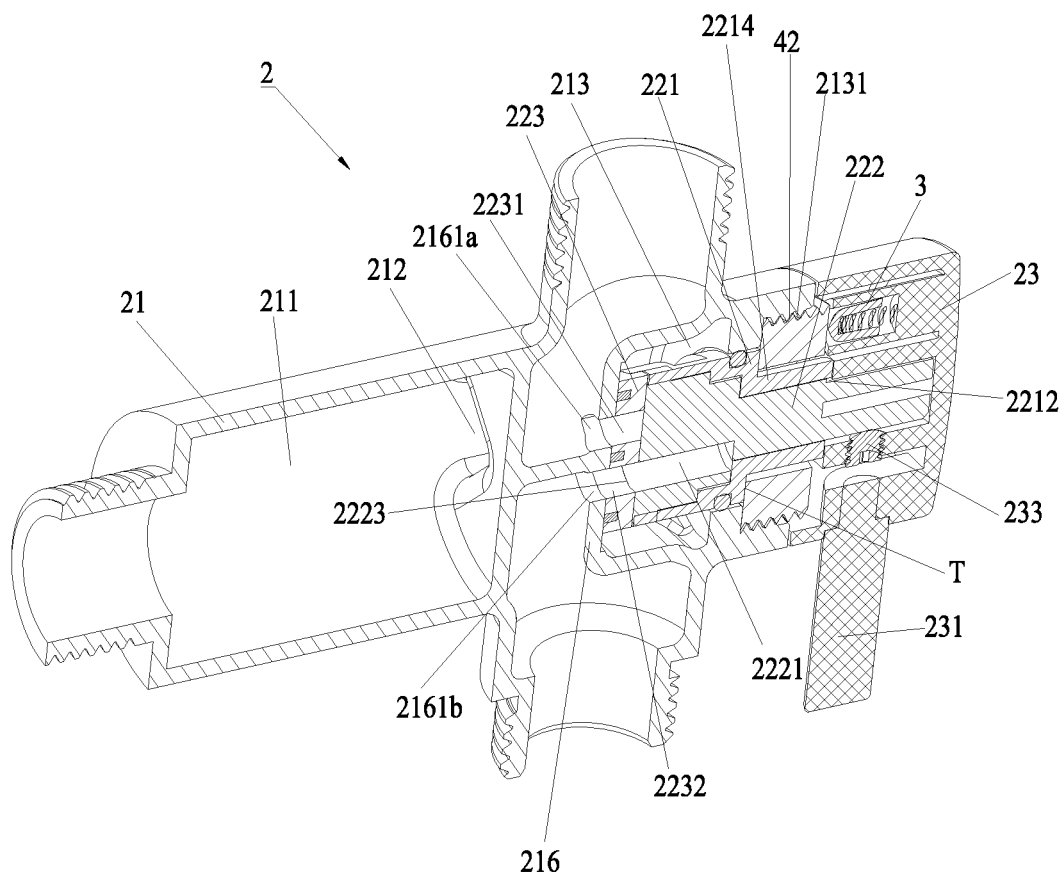
FIG. 9 is a perspective longitudinal sectional view of a valve seat and a water distributing valve core in an assembled state according to the present application.

Please refer to FIGS. 5 and 9, the water distributing valve core 22 includes a valve body 221, a valve shaft 222 and a water distributing piece 223. The valve body 221 is fixed in the valve core chamber 213 of the valve seat 21 through a valve core pressing block 4. Specifically, the valve core pressing block 4 is provided with a through hole 41 in a central portion thereof, and is provided with an external threaded connection segment 42 on an outer wall thereof, an outlet end of the valve core chamber 213 is provided with an internal threaded connection segment 2131, the external threaded connection segment 42 of the valve core pressing block 4 and the internal threaded connection segment 2131 of the valve core chamber 213 are threadedly connected to each other, so that the valve core pressing block 4 is fixed in the water outlet end of the valve core chamber 213. The valve body 221 is disposed into the valve core chamber 213, the valve body 221 has a hollow inner cavity, and one axial end toward the vertical partition 216 is an open end 2215, the other axial end is a closed end face 2216, and the closed end face 2216 is provided with a through shaft hole 2212 at a central portion thereof. The valve body 221 is provided with an axial extension segment 2214 in the direction of the shaft hole 2212, a step surface T is formed between the axial extension segment 2214 and the closed end face 2216 of the valve body 221. The axial extension segment 2214 of the valve body 221 passes through the through hole 41 of the valve core pressing block 4, and the valve core pressing block 4 and the step surface T of the valve body 221 abut against each other, so that the valve body 221 is fixed in the valve core chamber 213. A radial end of the valve body 221 is provided with several water inlets 2211.

The valve shaft 222 is rotatably disposed in the inner cavity of the valve body 221, and a shaft part 2220 of the valve shaft 222 extends outward through the shaft hole 2212 of the valve body 221. The valve shaft 222 is provided with a water-passing channel 2221, and a water inlet 2224 of the water-passing channel 2221 is in communication with the water inlets 2211 of the valve body 221; an external water source flows into the water inlet chamber 211 through the water inlet 2110, and flows into the valve core chamber 213 through the water inlet channel 212, and then flows into the water-passing channel 2221 through the water inlets 2211 of the valve body 221, and flows out through an axial water outlet 2223 of the water-passing channel 2221.

The water distributing piece 223 is fixedly arranged at the open end 2215 of the valve body 221. In one embodiment, the water distributing piece 223 is provided with several first positioning slots 2233 and several first positioning blocks 2234 which are evenly arranged in a staggered manner in a circumferential direction, and is provided with a pair of snap-hooks 2235. The valve body 221 is correspondingly provided with second positioning blocks 2217, second positioning slots 2218 and a pair of snap-slots 2219 at positions corresponding to the positions of the first positioning slots 2233, the first positioning blocks 2234 and the pair of snap-hooks 2235 of the water distributing piece 223. The water distributing piece 223 is fixed at the open end 2215 of the valve body 221 through the cooperation between the positioning blocks and positioning slots, and between the snap-hooks 2235 and the snap-slots 2219. The water distributing piece 223 is provided with a first water inlet 2231 and a second water inlet 2232 separated from each other. The first water inlet 2231 and the second water inlet 2232 are respectively in communication with the first water-passing opening 2161a and the second water-passing opening 2161b. Preferably, a sealing ring 224 is additionally provided between the water distributing piece 223 and the vertical partition 216 to prevent water flow from flowing out from a gap between the first water inlet 2231/the second water inlet 2232 and the first water-passing opening 2161a/ the second water-passing opening 2161b.

Figure 6:
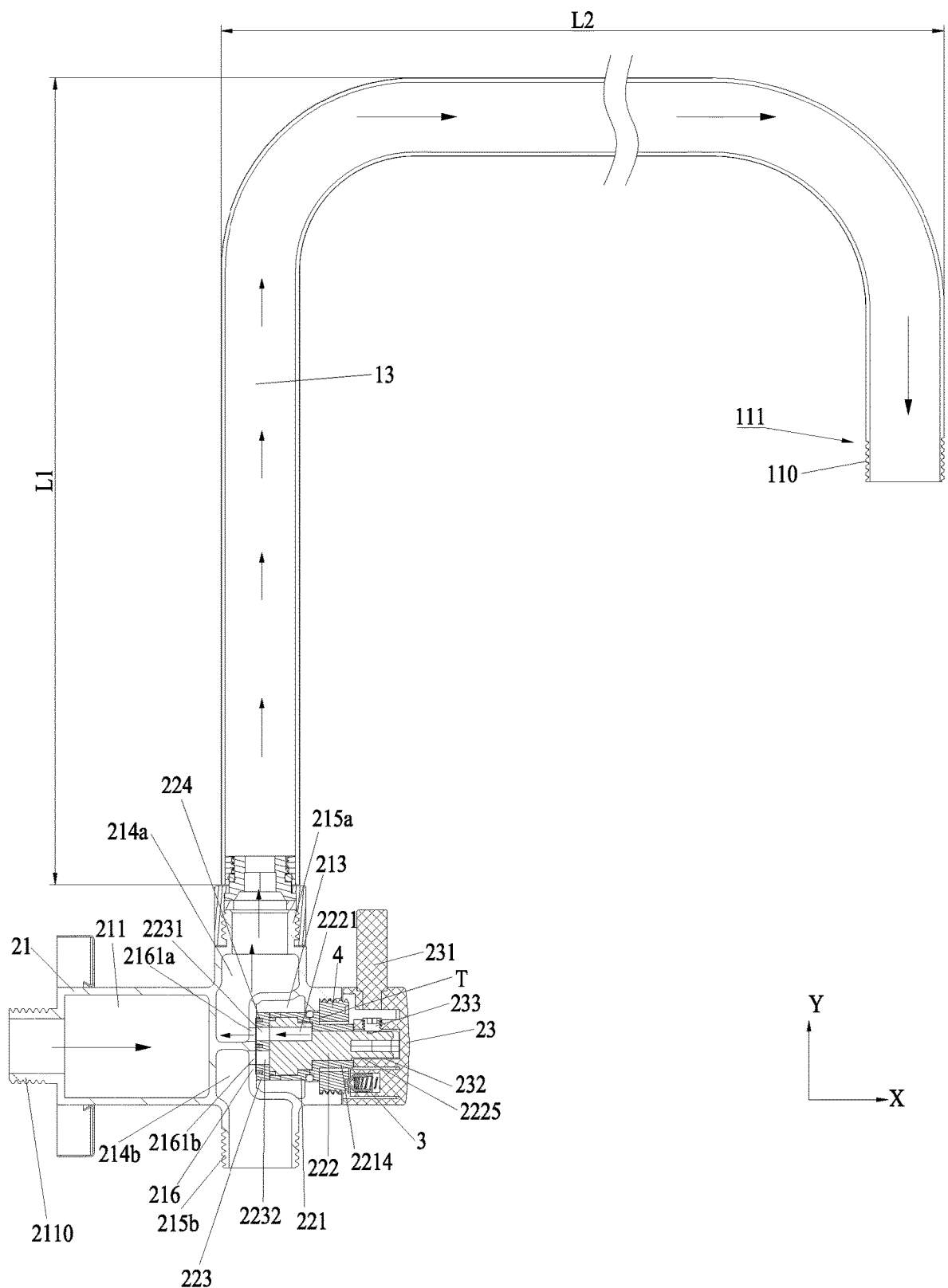
FIG. 6 is a schematic view showing a state when an axial water outlet end of a water distributing valve core is in fluid communication with a first water-passing opening according to the present application.
Figure 11:
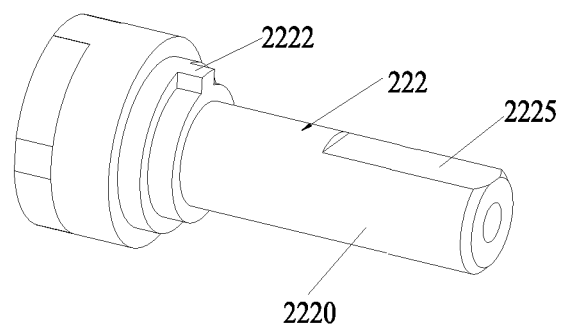
FIG. 11 is a structural view of a valve shaft according to the present application.

Please refer to FIGS. 6 and 11, the knob 23 is arranged at an outer end of the valve core chamber 213 and is fixedly connected to an extension segment of the valve shaft 222. In one embodiment, the knob 23 is provided with an abutting nut 233 arranged radially through the knob 23, the abutting nut 233 passes through a side wall of the knob 23, and abuts against the shaft part 2220 of the valve shaft 222 in an interference manner, so as to realize the fixed connection between the valve shaft 222 and the knob 23. A positioning flat surface 2225 is provided on a side wall of the shaft part 2220 of the valve shaft 222, and a matching flat surface 232 is provided at a corresponding position of the knob 23. When the valve shaft 222 is fixedly connected to the knob 23, the positioning flat surface 2225 of the shaft part 2220 of the valve shaft 222 is closely fitted with the matching flat surface 232 of the knob 23, so that turning the knob 23 can synchronously drive the valve shaft 222 to rotate.

Specific working principle of the present application is as follows.

Figure 7:
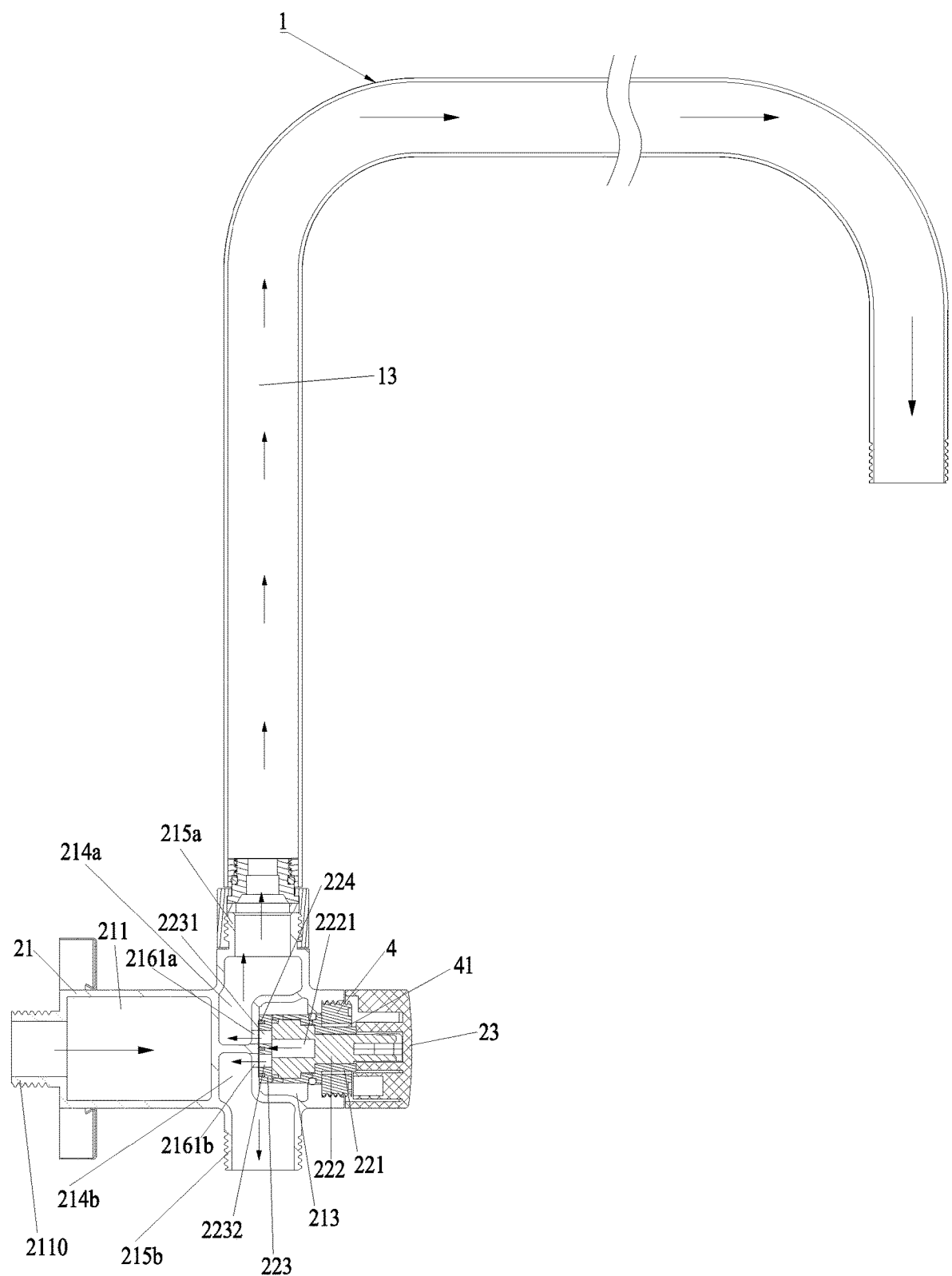
FIG. 7 is a schematic view showing a state when the axial water outlet end of the water distributing valve core is in fluid communication with both the first water-passing opening and a second water-passing opening according to the present application.
Figure 8:
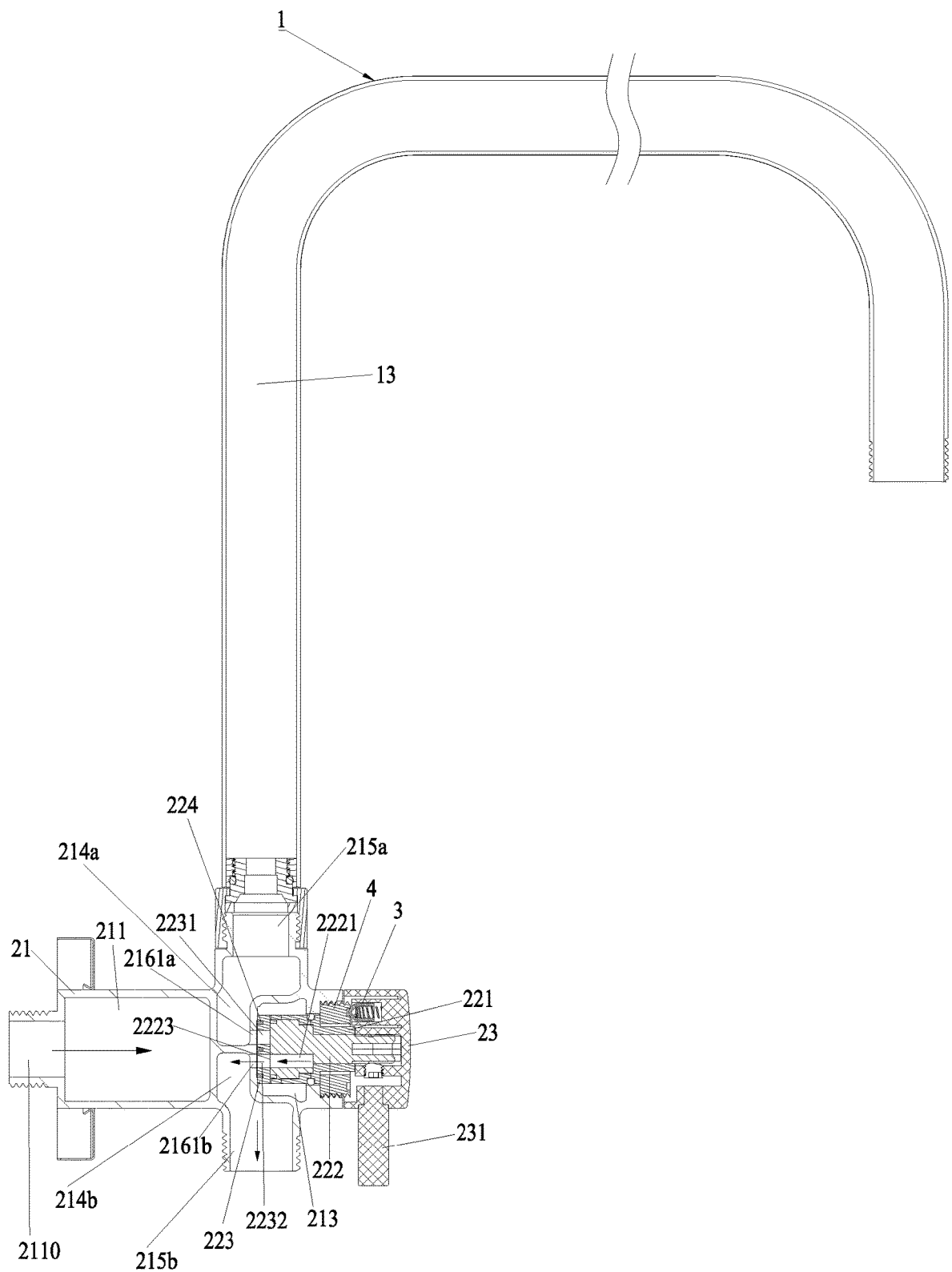
FIG. 8 is a schematic view showing a state when the axial water outlet end of the water distributing valve core is in fluid communication with the second water-passing opening according to the present application.

Referring to FIG. 6, turning the knob 23 can drive the valve shaft 222 to rotate synchronously, so that when the axial water outlet 2223 of the water-passing channel 2221 of the valve shaft 222 is in communication with the first water inlet 2231, the water flow flows into the first water holding chamber 214a through the first water inlet 2231 and the first water-passing opening 2161a in turn, and flows into the water outlet channel 13 of the shower column 1 through the first connection port 215a, at this time, the top spray 10 discharges water. Referring to FIG. 7, when the axial water outlet 2223 of the water-passing channel 2221 of the valve shaft 222 is in communication with both the first water inlet 2231 and the second water inlet 2232 at the same time, the water flow flows into the first water holding chamber 214a through the first water inlet 2231 and the first water-passing opening 2161a in turn, and also flows into the second water holding chamber 214b through the second water inlet 2232 and the second water-passing opening 2161b in turn, and also at the same time, the water flow flows through the first connection port 215a and the second water outlet 215b into the water outlet channel 13 of the shower column 1 and an inner cavity of the additional water apparatus corresponding thereto, respectively, and at this time, both the top spray 10 and the additional water apparatus discharge water. Referring to FIG. 8, when the axial water outlet 2223 of the water-passing channel 2221 of the valve shaft 222 is in communication with the second water inlet 2232, the water flow flows into the second water holding chamber 214b through the second water inlet 2232 and the second water-passing opening 2161b in turn, and flows into the inner cavity of the additional water apparatus through the second water outlet 215b, and at this time, the additional water apparatus discharges water.

Figure 10:
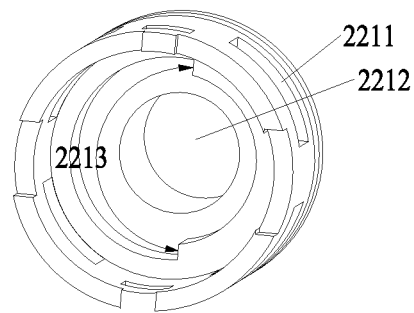
FIG. 10 is a structural view of an inner cavity wall of a valve body according to the present application.

Preferably, an inner cavity wall of the valve body 221 is provided with a first limit fitting part, and the valve shaft 222 is provided with a second limit fitting part corresponding to the first limit fitting part. The rotation range of the valve shaft 222 in the inner cavity of the valve body 221 is limited by the cooperation of the first limit fitting part and the second limit fitting part. The rotation range includes all the range where the axial water outlet 2223 of the water-passing channel 2221 of the valve shaft 222 rotates from the first water inlet 2231 to the second water inlet 2232 of the water distributing piece 223 to be connected to and in fluid communication with the second water inlet 2232. In an embodiment, please refer to FIGS. 10 and 11, the first limit fitting part is an arc-shaped limit notch 2213 in the inner cavity wall of the valve body 221, and the second limit fitting part is a convex stop 2222 provided at a corresponding position on the valve shaft 222, and when the valve shaft 222 rotates in the inner cavity of the valve body 221, the convex stop 2222 rotates within the range of the arc-shaped limit notch 2213.

Referring to FIG. 5, a positioning snap fastener 3 is provided between the valve core pressing block 4 and the knob 23. The valve core pressing block 4 is provided with three positioning counterbores 431 arranged circumferentially in an end face 43 on a side facing towards the knob 23. The positioning snap fastener 3 can switch between the three positioning counterbores 431 and generate a positioning sound. The three positioning counterbores 431 are sequentially arranged in a counterclockwise direction as a first positioning counterbore, a second positioning counterbore and a third positioning counterbore. The spacings between the second positioning counterbore and the first positioning counterbore and the third positioning counterbore are 90° respectively. By turning the knob 23 by 90° each time, the valve shaft 222 is driven to rotate synchronously, thus realizing the switching of the waterway communication position. The provision of the positioning snap fastener 3 prompts the user to adjust the positions of different waterway communication, facilitates usage.

Preferably, a handle indicating rod 231 is provided at an outer side wall of the knob 23, and the handle indicating rod 231 rotates synchronously with the knob 23. The handle indicating rod 231 is configured such that: when the handle indicating rod 231 is pointed to the direction of the first connection port 215a, the axial water outlet 2223 of the water-passing channel 2221 of the valve shaft 222 is only connected to and in communication with the first water inlet 2231; when the handle indicating rod 231 is pointed to the direction of the second water outlet 215b, the axial water outlet 2223 of the water-passing channel 2221 of the valve shaft 222 is only connected to and in communication with the second water inlet 2232; and when the handle indicating rod 231 is pointed to the direction of right middle between the first connection port 215a and the second water outlet 215b, the axial water outlet 2223 of the water-passing channel 2221 of the valve shaft 222 is connected to and in communication with both the first water inlet 2231 and the second water inlet 2232 at the same time. The provision of the handle indicating rod 231, in one aspect, is convenient for the user to adjust the knob 23, and in another aspect, is convenient for the user to directly judge the water outlet direction of the waterway connecting device according to the direction indicated by the handle indicating rod 231.

Figure 12:
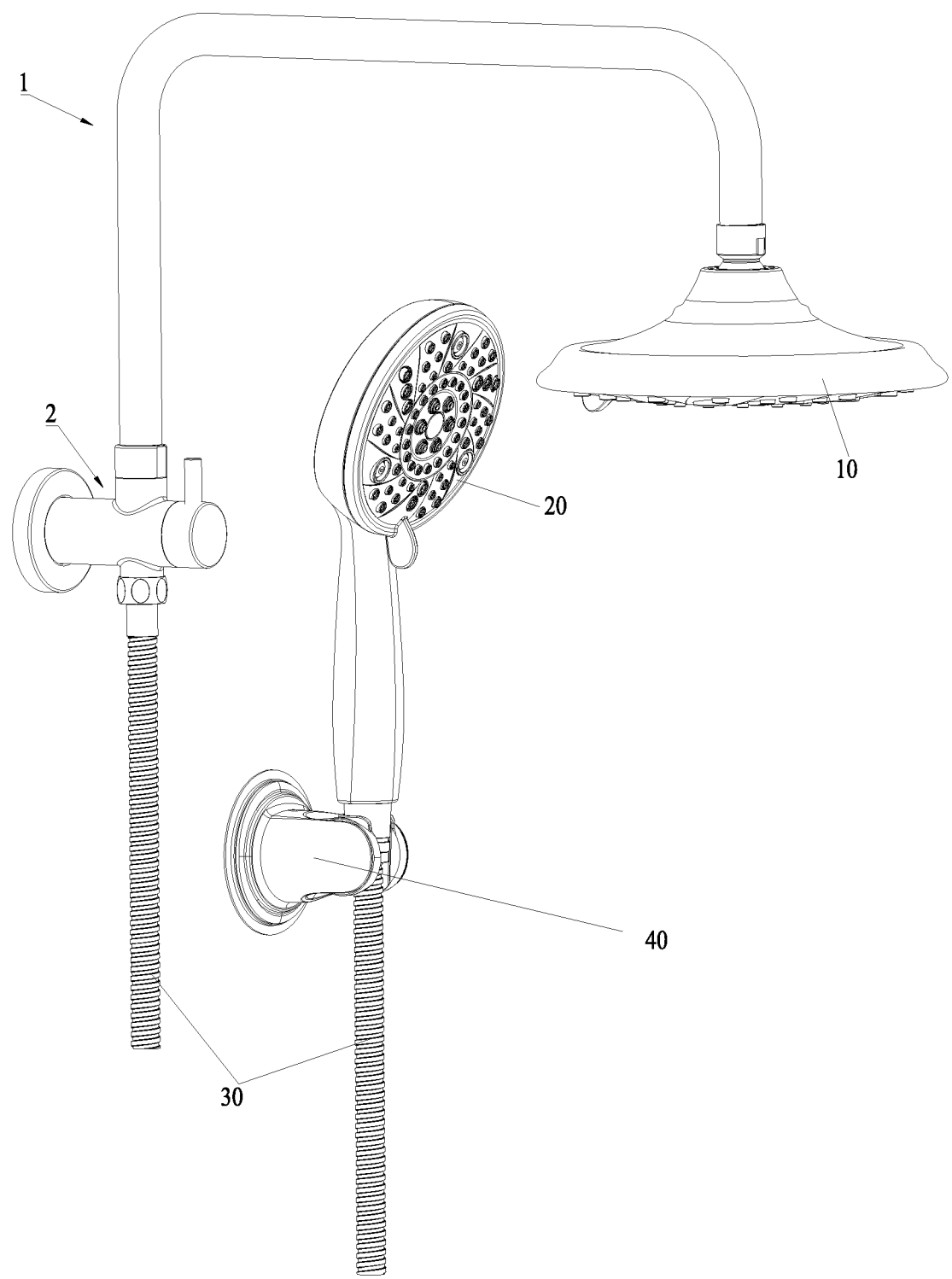
FIG. 12 is a schematic view showing the waterway connecting device according to the present application applied to a shower apparatus.

Referring to FIG. 12, the present application also discloses an embodiment of a shower assembly to which the connecting device for the shower apparatus is assembled, the shower assembly includes a top spray 10, a hand-held shower head 20 and the waterway connecting device described above. The top spray 10 is connected to the first water outlet 110 of the shower column 1. Since the top spray 10 is arranged at the first water outlet 110 of the shower column 1, the first water outlet 110 is high above the ground and vertically downward, and when the top spray 10 sprays, the potential energy of water flow can be increased, which can improve the shower experience. The hand-held shower head 20 can be connected to the second water outlet 215b through a flexible water outlet pipe 30. The hand-held shower head 20 can be fixed through an external fixed wall base 40 or suction cup wall base or adhesive wall base (not shown), and the height of its wall base 40 can be reasonably configured for easy use.

The above description merely relates to embodiments of the present disclosure, and is not intended to limit the design of the present disclosure. Any equivalent changes made according to key points of the design of the present disclosure will fall within the scope of protection of the present disclosure.

The invention claimed is:
1. A connecting device for a shower apparatus, the connecting device comprising:
  a shower column composed of a bending segment and a straight rod segment, when the shower column is in an installed state, a projection length of the shower column along a vertical projection plane (Y) is (L1), (L1) is between 210 mm and 310 mm, and a projection length of the shower column along a horizontal projection plane (X) is (L2), (L2) is between 290 mm and 350 mm, the bending segment is substantially L-shaped, and a lower part of a free end of the bending segment is provided with a first water outlet, the first water outlet is configured to connect a top spray, and the shower column is provided with a through water outlet channel therein;

a waterway switching device comprising a valve seat, a water distributing valve core and a knob; wherein the valve seat has a hollow inner cavity, a number of partitions are provided in the inner cavity, so that a water inlet chamber and a valve core chamber, which are mutually independent in space but are in fluid communication, are respectively formed at two axial ends, and a first water holding chamber and a second water holding chamber, which are mutually independent in space and have separated waterways, are formed at two radial ends; an outer end of the water inlet chamber is provided with a water inlet; an outer end of the first water holding chamber is provided with a first connection port, and the first connection port is vertically upward, and is connected to the straight rod segment of the shower column, an outer end of the second water holding chamber is provided with a second water outlet, and the second water outlet is configured to connect an additional water apparatus; a vertical partition is formed between the valve core chamber and the first water holding chamber and the second water holding chamber, respectively, the vertical partition is correspondingly provided with at least one first water-passing opening and one second water-passing opening at positions corresponding to the first water holding chamber and the second water holding chamber, so that the valve core chamber is in fluid communication with the first water holding chamber only through the first water-passing opening, and the valve core chamber is in fluid communication with the second water holding chamber only through the second water-passing opening; the water distributing valve core is configured to have at least one radial water inlet end and one axial water outlet end, the water distributing valve core is disposed in the valve core chamber, and an outer end of the valve core chamber is arranged with a knob, and the axial water outlet end of the water distributing valve core is driven to be in fluid communication with the first water-passing opening and/or the second water-passing opening by turning the knob.

2. The connecting device according to claim 1, wherein the water distributing valve core comprises a valve body and a valve shaft, the valve body has a hollow inner cavity and an axially through shaft hole, and the radial water inlet end is a water inlet opened at a radial end of the valve body; the valve shaft is rotatably disposed in an inner cavity of the valve body, and a shaft part of the valve shaft extends outward through the shaft hole of the valve body and is fixedly connected to the knob, the valve shaft is provided with a water-passing channel, a water inlet of the water-passing channel is in fluid communication with the water inlet of the valve body, and an axial water outlet of the water-passing channel is exactly the axial water outlet end.

3. The connecting device according to claim 2, wherein the valve body is further fixedly arranged with a water distributing piece at an axial end towards the vertical partition, the water distributing piece is provided with a first water inlet and a second water inlet separated from each other, the first water inlet and the second water inlet are respectively in communication with the first water-passing opening and the second water-passing opening; a sealing ring is additionally provided between the water distributing piece and the vertical partition, and the valve shaft is driven by the knob to rotate in the inner cavity of the valve body, to allow the axial water outlet end of the water-passing channel of the valve shaft to be connected to and in fluid communication with the first water inlet and/or the second water inlet of the water distributing piece.

4. The connecting device according to claim 2, wherein an inner cavity wall of the valve body is provided with a first limit fitting part, and the valve shaft is provided with a second limit fitting part corresponding to the first limit fitting part, the rotation range of the valve shaft in the inner cavity of the valve body is limited by the cooperation of the first limit fitting part and the second limit fitting part, the rotation range comprises all the range where the axial water outlet end of the water-passing channel of the valve shaft rotates from the first water inlet to the second water inlet of the water distributing piece to be connected to and in fluid communication with the second water inlet.

5. The connecting device according to claim 4, wherein the first limit fitting part is an arc-shaped limit notch in the inner cavity wall of the valve body, and the second limit fitting part is a convex stop provided at a corresponding position on the valve shaft, and when the valve shaft rotates in the inner cavity of the valve body, the convex stop rotates within the range of the arc-shaped limit notch.

6. The connecting device according to claim 2, wherein a positioning flat surface is provided on a side wall of the shaft part of the valve shaft, and a matching flat surface is provided at a corresponding position of the knob, and when the shaft part of the valve shaft is fixedly connected to the knob, the positioning flat surface of the shaft part is closely fitted with the matching flat surface of the knob, so that turning the knob is capable of synchronously driving the valve shaft to rotate.

7. The connecting device according to claim 6, wherein the knob is provided with an abutting nut arranged radially through the knob, the abutting nut passes through a side wall of the knob, and abuts against the shaft part of the valve shaft in an interference manner, to realize the fixed connection between the shaft part of the valve shaft and the knob.

8. The connecting device according to claim 2, further comprising a valve core pressing block, wherein the valve core pressing block is provided with a through hole in a central portion thereof, and the valve core pressing block is provided with an external threaded connection segment on an outer side wall thereof, an outlet end of the valve core chamber is provided with an internal threaded connection segment, the valve body is provided with an axial extension segment in the direction of the shaft hole, a step surface (T) is formed between the axial extension segment and an end face of the valve body, the valve body is disposed into the valve core chamber, the external threaded connection segment of the valve core pressing block and the internal threaded connection segment provided at the outlet end of the valve core chamber are threadedly connected to each other, the axial extension segment of the valve body passes through the through hole of the valve core pressing block, and the valve core pressing block and the step surface (T) of the valve body abut against each other, so that the valve body is fixed in the valve core chamber.

9. The connecting device according to claim 8, wherein a positioning snap fastener is provided between the valve core pressing block and the knob, the valve core pressing block is provided with three positioning counterbores arranged circumferentially in an end face on a side facing towards the knob, and the positioning snap fastener is capable of switching between the three positioning counterbores and generating a positioning sound when the knob drives the valve shaft to rotate and stay at different positions where different waterways are in fluid communication.

10. The connecting device according to claim 1, wherein the second water outlet is vertically downward, a handle indicating rod is provided at an outer side wall of the knob, and the handle indicating rod rotates synchronously with the knob, the handle indicating rod is configured such that: when the handle indicating rod is pointed to the direction of the first connection port, the axial water outlet end is only connected to and in communication with the first water-passing opening; when the handle indicating rod is pointed to the direction of the second water outlet, the axial water outlet end is only connected to and in communication with the second water passing opening; and when the handle indicating rod is pointed to the direction of right middle between the first connection port and the second water outlet, the axial water outlet end is connected to and in communication with both the first water-passing opening and the second water-passing opening, which is convenient for the user to directly judge the water outlet direction of the waterway connecting device according to the direction indicated by the handle indicating rod.

\* \* \* \* \*